US012709271B2

(12) United States Patent
Kanno

(10) Patent No.: US 12,709,271 B2
(45) Date of Patent: Aug. 18, 2026

(54) ACCELERATION/DECELERATION CONTROLLER

(71) Applicant: TOYOTA JIDOSHA KABUSHIKI KAISHA, Toyota (JP)

(72) Inventor: Yoshihito Kanno, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 19/043,575

(22) Filed: Feb. 3, 2025

(65) Prior Publication Data

US 2025/0263072 A1 Aug. 21, 2025

(30) Foreign Application Priority Data

Feb. 19, 2024 (JP) ................................ 2024-023209

(51) Int. Cl.
*B60W 30/14* (2006.01)
*B60W 40/08* (2012.01)
*B60W 50/00* (2006.01)

(52) U.S. Cl.
CPC .......... *B60W 30/143* (2013.01); *B60W 40/08* (2013.01); *B60W 50/0098* (2013.01); *B60W 2040/0809* (2013.01); *B60W 2050/0083* (2013.01); *B60W 2540/043* (2020.02)

(58) Field of Classification Search
CPC ............... B60W 30/143; B60W 40/08; B60W 50/0098; B60W 2040/0809; B60W 2040/043; B60W 2040/10; B60W 2040/103; B60W 2050/0083
USPC ........................................................... 701/93
See application file for complete search history.

(56) References Cited

U.S. PATENT DOCUMENTS 10,214,211 B2 * 2/2019 Kobayashi ............ B60W 30/16
2007/0075664 A1 * 4/2007 Muroi .................... B41J 19/202 318/270
2007/0173372 A1 * 7/2007 Ueno ........................ B60L 7/26 477/3
2015/0019058 A1 * 1/2015 Georgiev ................ B60L 58/12 701/22
2017/0217428 A1 * 8/2017 Tan ....................... B60W 10/20
2022/0274615 A1 * 9/2022 Kumagai ............ B60W 30/182
2022/0314810 A1 * 10/2022 Yokoo ................. B60L 15/2009

FOREIGN PATENT DOCUMENTS

DE 102021005903 A1 * 1/2023 ............ B60W 10/18
JP 2021-146777 A 9/2021
JP 2022-155157 A 10/2022

OTHER PUBLICATIONS

English Translation of DE102021005903 (Year: 2026).*

* cited by examiner

*Primary Examiner* — Krishnan Ramesh
(74) *Attorney, Agent, or Firm* — Dinsmore & Shohl LLP

(57) ABSTRACT

An acceleration/deceleration controller for controlling acceleration/deceleration of a vehicle by a one-pedal, includes: a processor to, in a case of vehicle's deceleration, change acceleration-off deceleration to be weaker than an initial value as a frequency of re-stepping operation, in which an acceleration-on operation is conducted immediately after a human recognizable time after an acceleration-off operation, increases, and change the acceleration-off deceleration to be greater than the initial value as the frequency of the re-stepping operation decreases.

3 Claims, 5 Drawing Sheets

1
DEGREE OF ACCELERATION
VEHICLE SPEED
IGNITION ON/OF
2
DETECTING DEVICE
5
CONTROLLER
51
SETTING UNIT
52
DETERMINA-TION UNIT
53
CALCULATION UNIT
54
CHANGING UNIT
3
DRIVING DEVICE
4
RECORDING UNIT
41
RE-STEPPING FREQUENCY INFORMATION RECORDING UNIT

ACCELERATION/DECELERATION CONTROLLER

CROSS-REFERENCE TO RELATED APPLICATION(S)

The present application claims priority to and incorporates by reference the entire contents of Japanese Patent Application No. 2024-023209 filed in Japan on Feb. 19, 2024.

BACKGROUND

The present disclosure relates to an acceleration/deceleration controller.

Japanese Laid-open Patent Publication No. 2021-146777 discloses a technique for suppressing discomfort that a driver feels until getting familiar with the one-pedal drive function. In this technology, in a vehicle in which acceleration and deceleration can be controlled by a one-pedal, the degree of skill to the driver's one-pedal drive function is calculated, and as the degree of skill increases, the amount of suppression of the deceleration force by the one-pedal function is reduced.

SUMMARY

There is a need for providing an acceleration/deceleration controller capable of accurately determining the degree of skill of the driver's one-pedal operation.

According to an embodiment, an acceleration/deceleration controller for controlling acceleration/deceleration of a vehicle by a one-pedal, includes: a processor to, in a case of vehicle's deceleration, change acceleration-off deceleration to be weaker than an initial value as a frequency of re-stepping operation, in which an acceleration-on operation is conducted immediately after a human recognizable time after an acceleration-off operation, increases, and change the acceleration-off deceleration to be greater than the initial value as the frequency of the re-stepping operation decreases.

DETAILED DESCRIPTION

In Japanese Laid-open Patent Publication No. 2021-146777, since the proficiency of the one pedal is determined only by the simple operation result of the driver, there is a problem that the accuracy of estimating the proficiency of the one pedal operation of the driver is low.

Hereinafter, an acceleration/deceleration controller according to an embodiment of the present disclosure will be described with reference to the drawings. Note that the components in the following embodiments include those which can be substituted and easily by those skilled in the art, or those which are substantially the same. Further, the drawings referred to in the following description are only schematically illustrating the shape, size, and positional relationship to the extent that the contents of the present disclosure can be understood. In other words, the present disclosure is not limited only to the shape, size, and positional relationship exemplified in each of the figures.

First Embodiment

Configuration of Acceleration/Deceleration Controller

Figure 1:
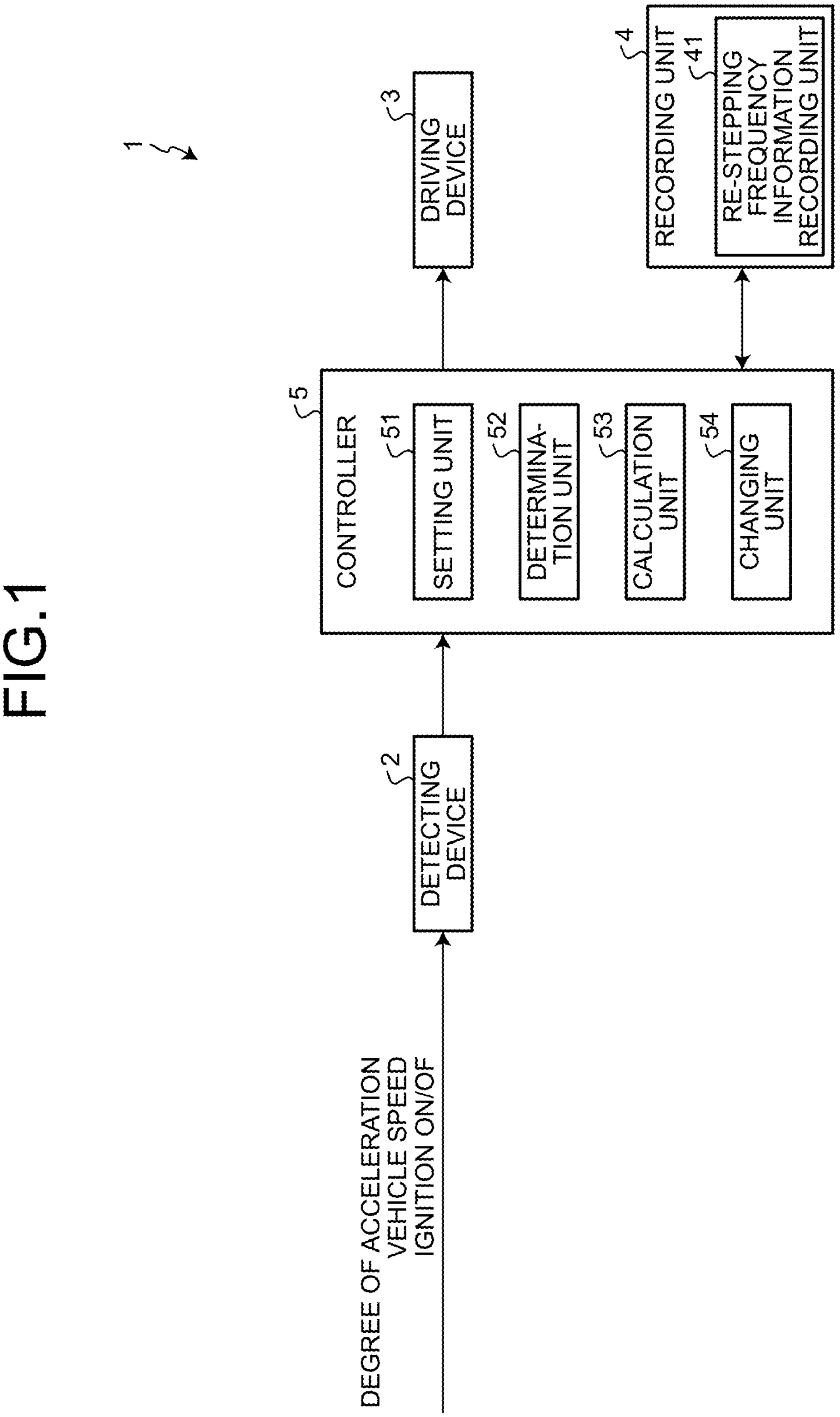
FIG. 1 is a block diagram illustrating a functional configuration of an acceleration/deceleration controller according to a first embodiment.

FIG. 1 is a block diagram illustrating a functional configuration of an acceleration/deceleration controller according to a first embodiment. The acceleration/deceleration controller 1 illustrated in FIG. 1 is mounted on a one-pedal operable vehicle, such as a Fuel Cell Electric Vehicle (FCEV), a Hybrid Electric Vehicle (HEV), an Electric Vehicle (EV) and a Plug-in Hybrid Electric Vehicle (PHEV). The acceleration/deceleration controller 1 includes a detecting device 2, a driving device 3, a recording unit 4, and a controller 5.

The detecting device 2 detects the degree of accelerator opening with respect to the pedal provided in the vehicle, the velocity of the vehicle and the on-off of the ignition switch (hereinafter, simply referred to as "IG"), and outputs the detected detection result to the controller 5. The detecting device 2 is configured by using an accelerator opening sensor, a vehicle speed sensor, an acceleration sensor, an ignition switch detection sensor, or the like.

The driving device 3 is configured using, for example, a plurality of motors, inverters, batteries, engines, motor generators, front wheels, rear wheels, and reduction gears, etc., to drive the vehicle. The driving device 3, under the control of the control unit 5, drives.

The recording unit 4 records various kinds of information related to the acceleration/deceleration controller 1. The recording unit 4 is configured using a flash memory, a volatile memory, a non-volatile memory, a Hard Disk Drive (HDD), and a Solid State Drive (SSD). The recording unit 4 includes a re-stepping frequency information recording unit 41. The re-stepping frequency information recording unit 41 records the number of times of deceleration while the vehicle is running and the number of times of treading by the driver in the accelerator-off. Here, the running of the car is the duration in which IG is turned from the on-state to the off-state.

The controller 5 is implemented using a memory and a processor having hardware.

The hardware may be, for example, memories, a Central Processing Unit (CPU), a Digital Signal Processor (DSP) and a Field-Programmable Gate Array (FPGA). The controller 5, based on various detection results input from the detecting device 2, controls the acceleration and deceleration of the vehicle by controlling the driving of the driving device 3. The controller 5 includes a setting unit 51, a determination unit 52, a calculation unit 53 and a changing unit 54. In the first embodiment, the controller 5 functions as a processor.

The setting unit 51 sets the strong deceleration (deceleration characteristic) in the accelerator off as the initial value. Specifically, the setting unit 51 sets the initial deceleration setting with respect to the accelerator off as the initial value where the deceleration is the highest.

The determination unit 52, based on the detection result detected by the detecting device 2, determines whether the vehicle is decelerated.

The calculation unit 53 computes the pedaling frequency with respect to the pedal by the driver in a predetermined period based on the detection result detected by the detecting device 2 and the depressing frequency information recorded by the re-stepping frequency information recording unit 41.

The changing unit 54 changes the deceleration in the accelerator-off according to the stepping-off frequency calculated by the calculation unit 53 which calculates the initial value of the deceleration in the accelerator-off that is set by the setting unit 51.

Process Executed by the Acceleration/Deceleration Controller

Figure 2:
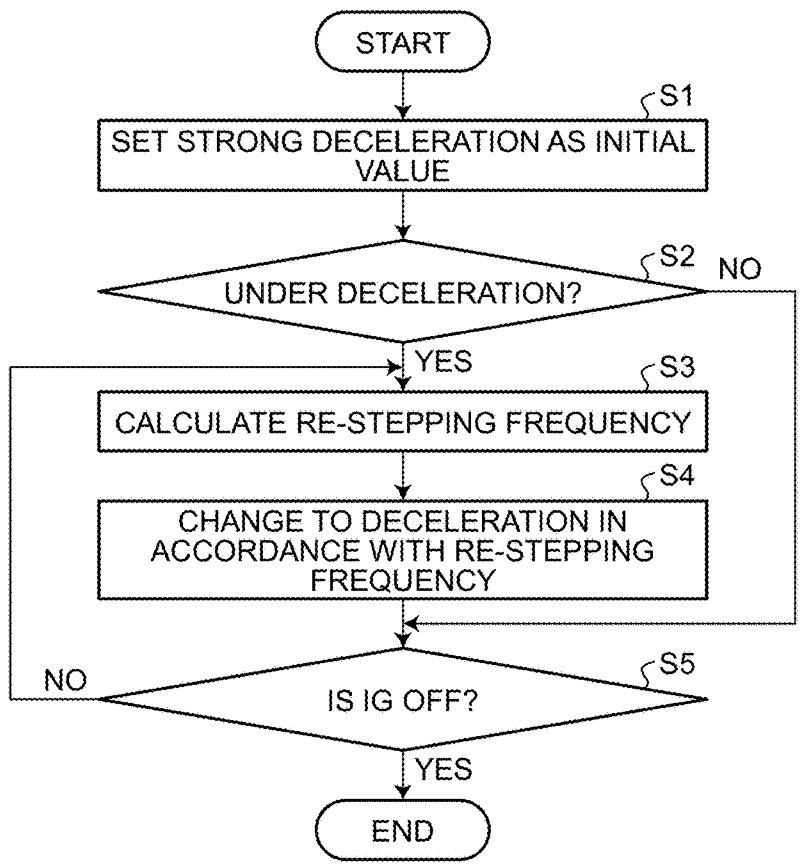
FIG. 2 is a flowchart illustrating an outline of processing that is executed by the acceleration/deceleration controller according to a first embodiment.

Next, the processing executed by the acceleration/deceleration controller 1 will be described. FIG. 2 is a flowchart illustrating an outline of processing that is executed by the acceleration/deceleration controller 1.

Figure 5:
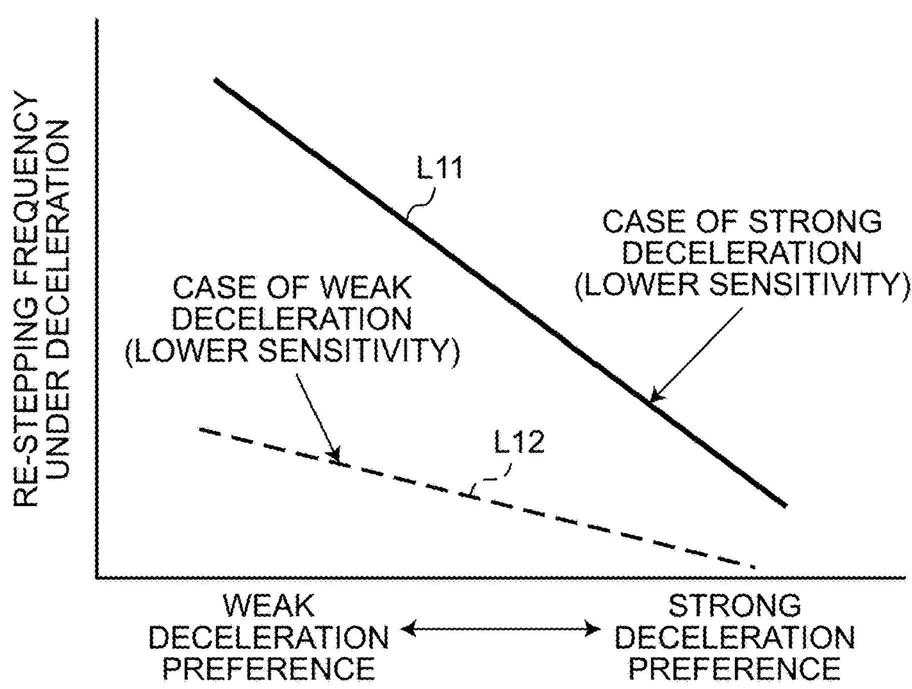
FIG. 5 is a diagram illustrating the effect of vehicle deceleration strength.

As illustrated in FIG. 2, first, the setting unit 51 sets the strong deceleration (deceleration characteristic) in the accelerator-off as the default value (step S1). Specifically, the setting unit 51 sets the initial deceleration setting with respect to the accelerator off as the initial value where the deceleration is the highest. Re-operation of the accelerator operation with respect to the pedal by the driver occurs more when the deceleration is stronger than when the deceleration is weak (see, for example, FIG. 5. Note that the linear L11 indicates the relationship between the frequency of the driver's re-stepping operation in the case of strong deceleration (high sensitivity) and the driver's preference, and the linear L12 indicates the relationship between the frequency of the driver's re-stepping operation in the case of weak deceleration (low sensitivity) and the driver's preference). Therefore, the setting unit 51 can improve the detection speed and accuracy of whether the deceleration characteristic for the driver is appropriate by setting the initial deceleration setting for the accelerator off to the value having the strongest deceleration as the initial value.

Subsequently, the determination unit 52 determines whether the vehicle has decelerated based on the detection result detected by the detecting device 2 (step S2). When it is determined by the determination unit 52 that the vehicle has decelerated (step S2: Yes), the acceleration/deceleration controller 1 proceeds to step S3 described below. In contrast, when it is determined that the vehicle is not decelerated by the determination unit 52 (step S2: No), the acceleration/deceleration controller 1 shifts to step S5.

In step S3, the calculation unit 53 calculates the pedaling frequency with respect to the pedaling by the driver in a certain period based on the detection result detected by the detecting device 2 and the depressing frequency information recorded by the re-stepping frequency information recording unit 41.

Figure 3:
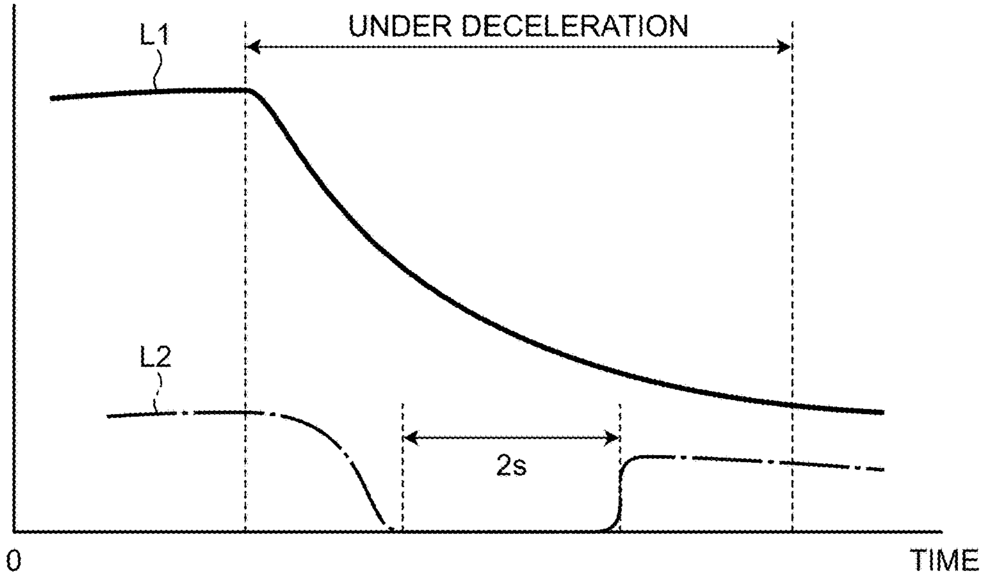
FIG. 3 is a diagram schematically illustrating the time change of the vehicle speed and the degree of acceleration in the pedal depressing operation when the driver is not in line with his/her intention.

FIG. 3 is a diagram schematically illustrating the time change of the vehicle speed and the degree of acceleration in the pedal depressing operation when the driver is not in line with his/her intention. In FIG. 3, the horizontal axis represents time, and the vertical axis represents vehicle speed or degree of accelerator opening. Further, in FIG. 3, the curve L1 indicates the vehicle speed, and the curve L2 indicates the degree of acceleration.

As illustrated in the curvilinear L1 and the curvilinear L2 of FIG. 3, the calculation unit 53 calculates the reentry frequency by dividing the frequency (number of times) of the acceleration fully closed by the total number of times of the deceleration during traveling in a predetermined time period during deceleration of the vehicle. Here, the predetermined time period is less than the time a time period equal to, for example, several times of human information processing (e.g., 250 ms/times), that is for example, 2 s. In addition, the total number of decelerations during travel refers to the number of decelerations during the time from when IG is turned on until IG is turned off. As a result, when the vehicle is decelerating, the calculation unit 53 calculates the pedaling frequency by dividing the frequency (number of times) at which the accelerator is fully closed by the total number of decelerations while the treading frequency information recording unit 41 of the recording unit 4 is recording.

Returning to FIG. 2, the explanation will continue after step S4. In step S4, the changing unit 54 changes the deceleration in the accelerator-off according to the stepping-off frequency calculated by the calculation unit 53 which calculates the initial value of the deceleration in the accelerator-off set by the setting unit 51.

Figure 4:
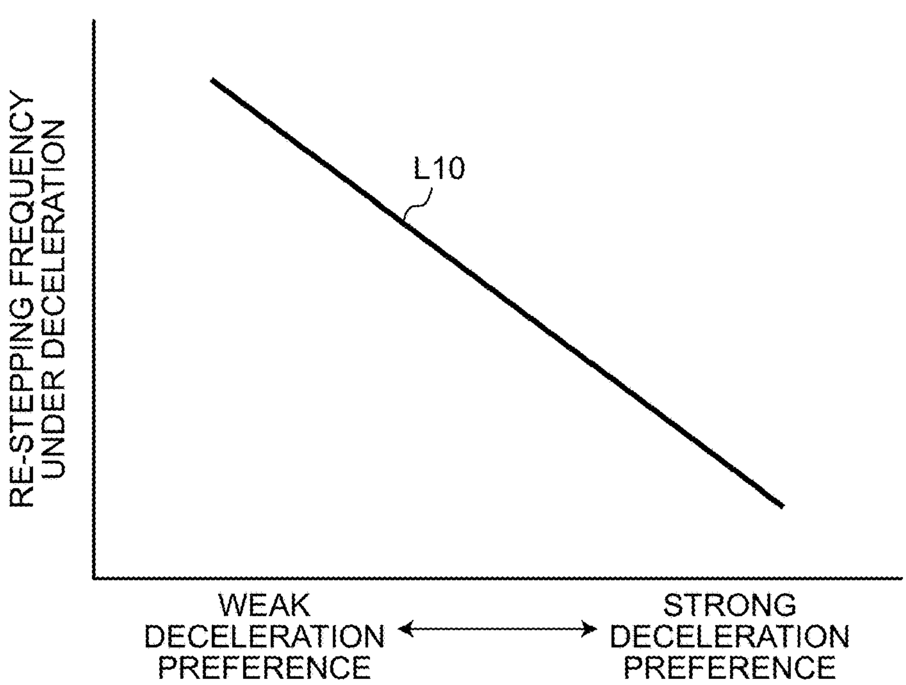
FIG. 4 is a diagram illustrating a relationship between the frequency of the stepping operation of the driver and the preference of the driver.

FIG. 4 is a diagram illustrating a relationship between the frequency of the stepping operation of the driver and the preference of the driver. In FIG. 4, the vertical axis indicates the frequency of treading during deceleration, and the horizontal axis indicates the driver's preference. In addition, the linear L10 in FIG. 4 illustrates the relationship between the frequency of depressing the driver and the driver's preference.

For example, as illustrated in a straight line L10 of FIG. 4, the changing unit 54 makes a change to weaken the deceleration when the accelerator is closed, as the frequency of the pedal redoing of the driver's accelerator increases during deceleration of the vehicle. In contrast, the changing unit 54 performs a change that intensifies the deceleration when the accelerator is closed, as the frequency of re-stepping of the driver's accelerator during deceleration of the vehicle is small. Thus, the deceleration of the accelerator can be adjusted according to the current state (preference) of the driver.

Returning to FIG. 2, the explanation will continue after step 5. In step S5, when the IG is turned off (step S5: Yes), the acceleration/deceleration controller 1 ends this process. In contrast, when the IG is not turned off (step S5: No), the acceleration/deceleration controller 1 returns to step S3.

According to the first embodiment described above, since the changing unit 54 changes the initial value of the deceleration in the accelerator-off set by the setting unit 51 to the deceleration in the accelerator-off according to the stepping-off frequency calculated by the calculation unit 53. Therefore, it is possible to accurately determine the degree of skill in the one pedal operation of the driver.

Second Embodiment

Next, the second embodiment will be described.

In the first embodiment, when the ignition switch is turned to the ON state, the deceleration of the initial value in accelerator-off is set to the highest value, but in this second embodiment, it is set to the deceleration associated with the driver. In the following, the configuration of the acceleration/deceleration controller according to the second embodiment will be described, and processing performed by the acceleration/deceleration controller according to the second embodiment will be described.

The same components as those of the acceleration/deceleration controller according to the first embodiment are denoted by the same reference numerals, and a detailed description thereof will be omitted.

Configuration of Acceleration/Deceleration Controller

Figure 6:
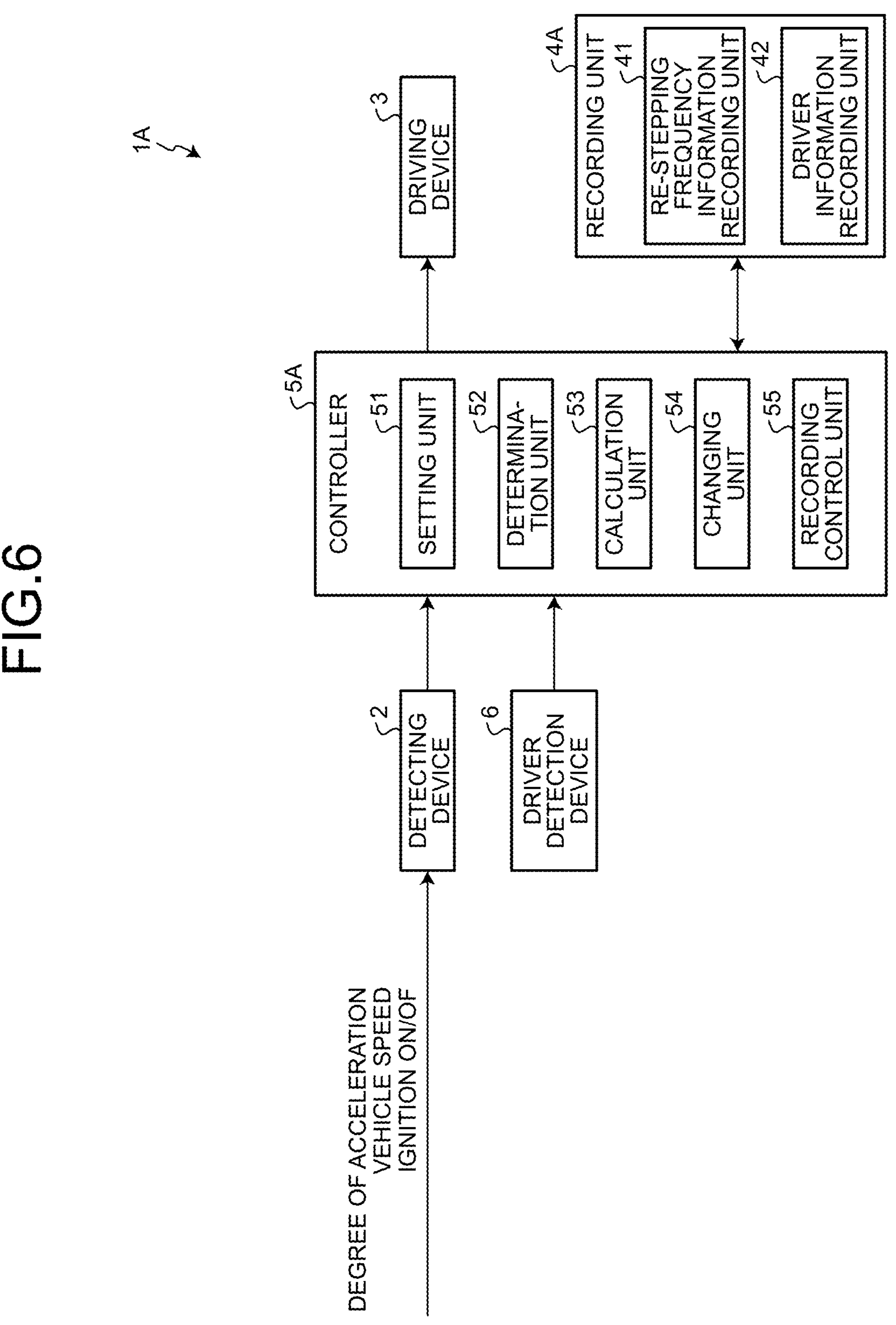
FIG. 6 is a block diagram illustrating the functional configuration of the acceleration/deceleration controller according to a second embodiment.

FIG. 6 is a block diagram illustrating the functional configuration of the acceleration/deceleration controller according to the second embodiment. The acceleration/deceleration controller 1A illustrated in FIG. 6 further includes a driver detection device 6 in addition to the functional configuration of the acceleration/deceleration controller 1 according to the first embodiment. The acceleration/deceleration controller 1A further includes a recording unit 4A and a controller 5A, instead of the recording unit 4 and the controller 5 of the acceleration/deceleration controller 1 according to the first embodiment.

The driver detection device 6 detects the driving vehicle riding on the vehicle, and outputs the detection result to the controller 5A. Specifically, the driver detection device 6 detects the face of the driving vehicle by a well-known pattern matching process or the like and outputs the detection result to the controller 5A. The driver detection device 6 is configured using a camera or the like.

The recording unit 4A further includes a driver information recording unit 42 in addition to the configuration of the recording unit 4 according to the first embodiment. The driver information recording unit 42 records the driver information in which the deceleration of the initial value in the accelerator-off is set for each driver identification information identifying the driver.

The controller 5A further includes a recording control unit 55 in addition to the functional configuration of the controller 5 according to the first embodiment. In the second embodiment, the controller 5A functions as a processor.

The recording control unit 55 records the current deceleration in the accelerator-off and the driver identification information in the driver information recording unit 42 in association with each other.

Processing of the Acceleration/Deceleration Controller

Figure 7:
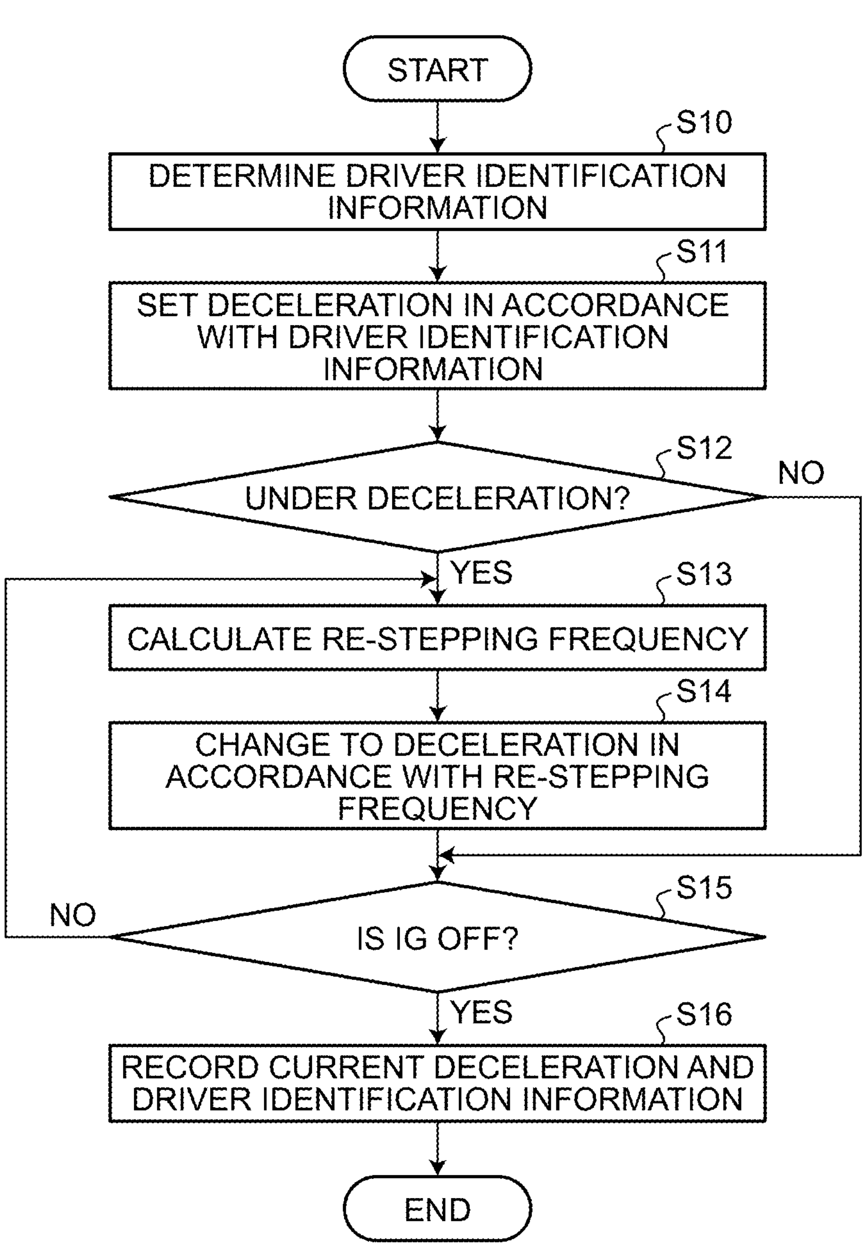
FIG. 7 is a flowchart illustrating an outline of processing that is executed by the acceleration/deceleration controller according to the second embodiment.

Next, the process executed by the acceleration/deceleration controller 1A will be described. FIG. 7 is a flow chart illustrating an outline of a process that is executed by the acceleration/deceleration controller 1A.

As illustrated in FIG. 7, the determination unit 52 determines the driver identification information identifying the driver based on the driver's face detected by the driver detection device 6 and the driver information recorded by the driver information recording unit 42 (step S10). Specifically, the determination unit 52 determines whether the driver identification information (driver ID) is recorded in the driver information in which the driver's facial feature pattern detected by the driver detection device 6 is recorded by the driver information recording unit 42.

Subsequently, when the determination unit 52 determines that there is the driver identification information in the driver information recording unit 42, the setting unit 51 sets the deceleration in the accelerator-off according to the driver identification information (driver ID) of the driver determined by the determination unit 52 (step S11). When it is determined by the determination unit 52 that there is no driver identification information in the driver information recording unit 42, the setting unit 51 sets the deceleration in the accelerator-off to the initial value. Specifically, the setting unit 51 sets the initial deceleration setting with respect to the accelerator off as the initial value where the deceleration is the highest.

Since step S12 to step S15 correspond to each of step S2 to step S5 in FIG. 2, respectively, the detailed description thereof will not be repeated. After step S15, the acceleration/deceleration controller 1A shifts to step S16.

In step S16, the recording control unit 55 records the present deceleration in the accelerator-off and the driver identification information in the driver information recording unit 42 in association with each other. After step S16, the acceleration/deceleration controller 1A ends this process.

According to the second embodiment described above, when the driver identification information is determined by the determination unit 52, since the setting unit 51 sets the deceleration in the accelerator-off associated with the driver (driver identification information), the deceleration suitable for the driver can be set at the start immediately after IG is turned on.

Other Embodiments

Further effects and variations can be readily derived by one skilled in the art. The broader aspects of the present disclosure are not limited to the specific details and representative embodiments expressed and described above.

Accordingly, various changes may be made without departing from the spirit or scope of the overall concept defined by the appended claims and their equivalents.

While some of the embodiments of the present application have been described in detail based on the drawings, these are illustrative, and it is possible to implement the present disclosure in other forms which are variously modified and improved based on the knowledge of those skilled in the art, starting from the aspects described in the column of the disclosure of the present disclosure.

According to the present disclosure, there is an effect that it is possible to accurately determine the degree of skill of the one pedal operation of the driver.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An acceleration/deceleration controller for controlling acceleration/deceleration of a vehicle by a one-pedal, comprising:

a processor configured to, in a case of vehicle's deceleration, change acceleration-off deceleration to be weaker than an initial value as a frequency of re-stepping operation, in which an acceleration-on operation is conducted immediately after a predetermined time period after an acceleration-off operation, increases, and change the acceleration-off deceleration to be greater than the initial value as the frequency of the re-stepping operation decreases.

2. The acceleration/deceleration controller according to claim 1, wherein the processor is configured to set the initial value of the acceleration-off deceleration to a highest value.

3. The acceleration/deceleration controller according to claim 1, wherein the processor is configured to set the acceleration-off deceleration to an acceleration-off deceleration in accordance with a driver identification information identifying a driver driving the vehicle.

* * * * *